May 9, 1933. C. E. TARONI ET AL 1,907,463
APPARATUS FOR MAKING SPONGE CAKE AND THE LIKE
Filed Sept. 8, 1931 2 Sheets-Sheet 1
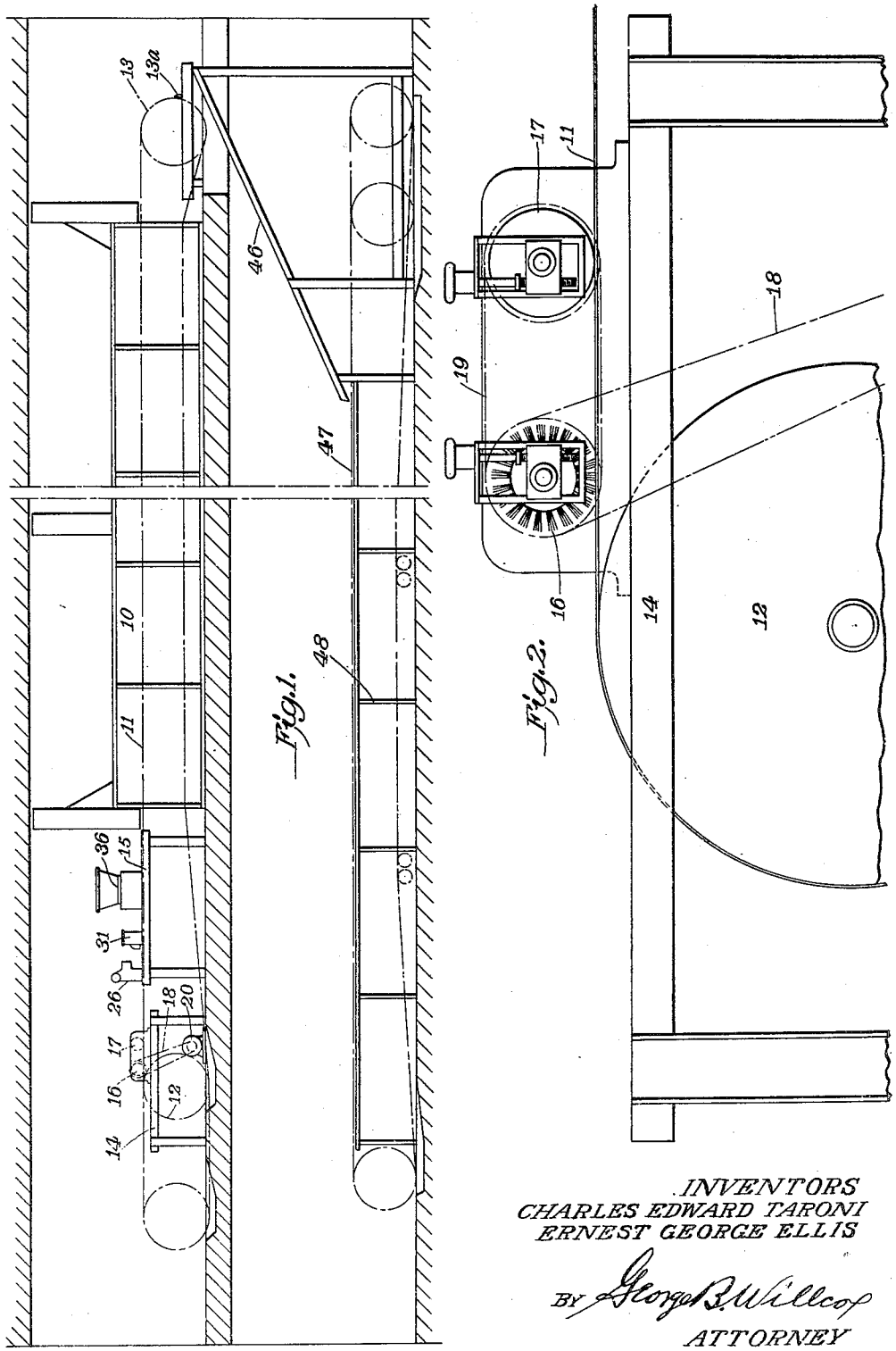
INVENTORS
CHARLES EDWARD TARONI
ERNEST GEORGE ELLIS
BY George B. Willcop
ATTORNEY May 9, 1933.  C. E. TARONI ET AL  1,907,463
APPARATUS FOR MAKING SPONGE CAKE AND THE LIKE
Filed Sept. 8, 1931   2 Sheets-Sheet 2
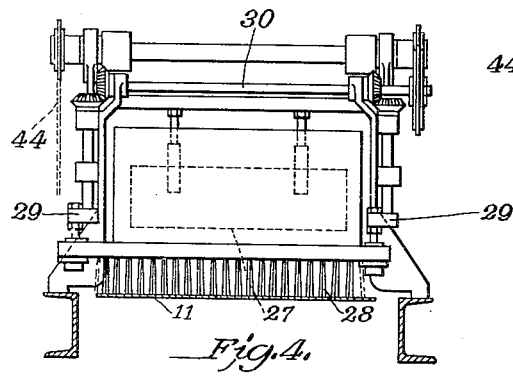
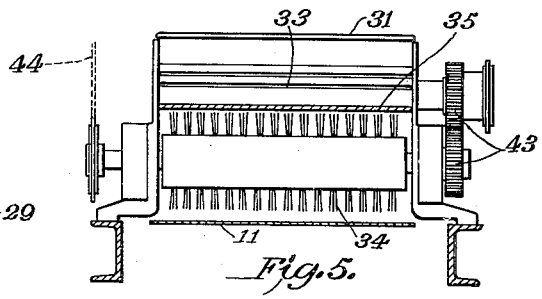
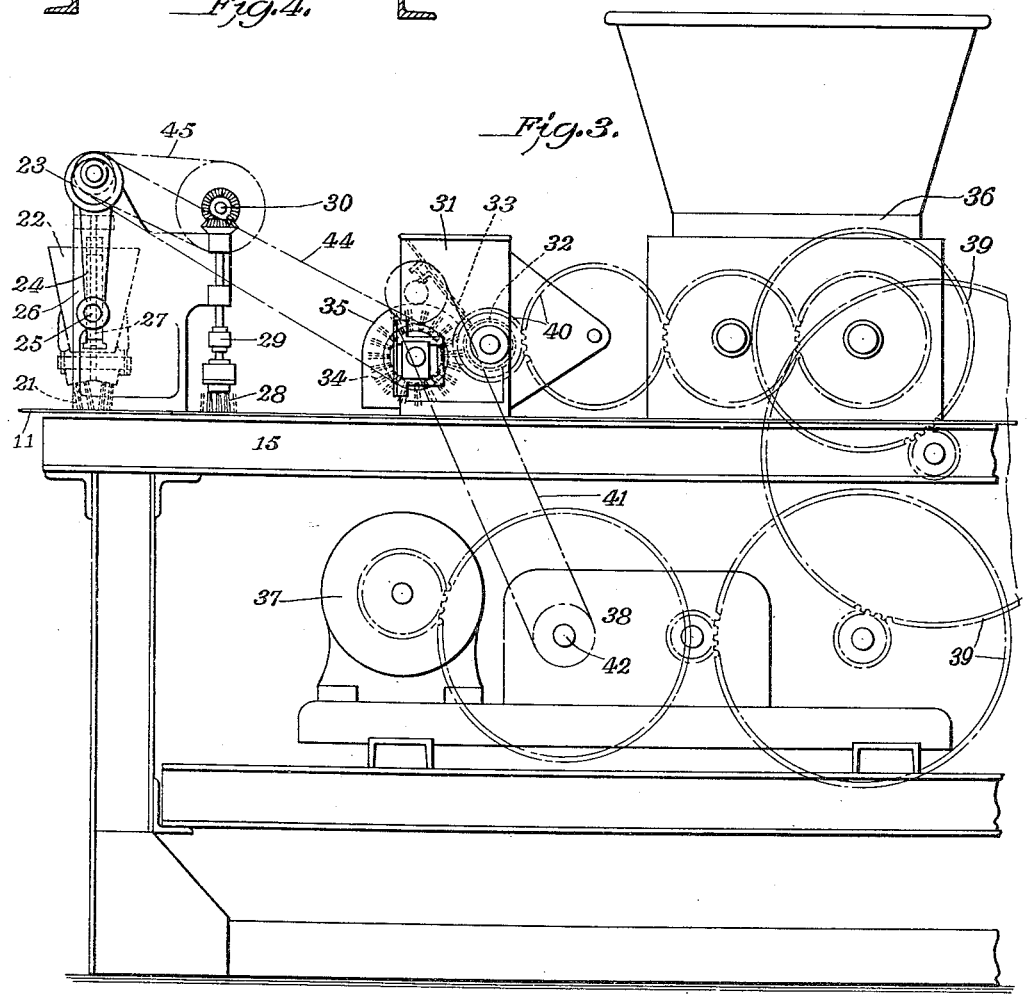
INVENTORS
CHARLES EDWARD TARONI
ERNEST GEORGE ELLIS
BY George B. Willcox
ATTORNEY Patented May 9, 1933

1,907,463

UNITED STATES PATENT OFFICE

CHARLES EDWARD TARONI, OF WILLESDEN, LONDON, AND ERNEST GEORGE ELLIS, OF LEYTONSTONE, LONDON, ENGLAND, ASSIGNORS TO BAKER PERKINS COMPANY, INC., OF SAGINAW, MICHIGAN, A CORPORATION OF NEW YORK

APPARATUS FOR MAKING SPONGE CAKE AND THE LIKE

Application filed September 8, 1931, Serial No. 561,560, and in Great Britain September 20, 1930.

This invention relates to an improved method of and means for the manufacture of sponge cake and the like wherein the sponge material or batter is passed through the baking chamber in a continuous sheet, and the continuous sheet of baked cake is subsequently treated and cut up to produce the finished goods desired.

Such an arrangement is disclosed in our prior United States Patent No. 1,795,688 and an object of the present invention is to provide improvements or modifications in the process and apparatus as set forth therein.

The present invention comprises a method of making sponge cake or the like wherein the sponge batter is deposited in a continuous layer directly upon a continuous traveling oven sole which has been prepared by greasing and dusting with flour and passed through the baking chamber.

The invention also comprises a method of making sponge cake or the like wherein a continuously traveling oven sole is subjected to treatments (cleaning, greasing and also dusting, if desired) on its way to a depositing position where it receives a continuous layer of material which travels with the sole into the baking chamber.

The invention also consists in a plant for the production of a continuous sheet of sponge cake comprising a continuous traveling oven, preferably in the form of an endless metal band, means for cleaning the sole, means for coating the sole with a film of grease, and means for depositing a continuous layer of material on the treated oven sole.

The invention also comprises a plant as set forth in the preceding paragraph wherein means are provided for dusting the greased oven sole prior to depositing the sponge material thereon.

The method disclosed in the above-mentioned U. S. patent has several disadvantages in practice. In order to remove the paper backing-sheet from the baked cake it is necessary to wet the paper thoroughly. This results in moistening the cake so that after jelly or other filling has been spread on the inverted bottom surface, the finished product is soggy. Also the paper is apt to adhere to the cake in spite of the moistening, so that it must be removed by hand, which is inconvenient and often results in breaking the surface to which the filling is to be applied.

The improved method and apparatus disclosed in this specification eliminates these difficulties, as well as the expense for the paper strip. The greasing of the baking surface permits of the easy separation of the baked cake from the surface, while the combination of the thin coating of grease and the even dusting of flour on the surface produces a surface on the cake which is dry, tender and practically free from any excess of either grease or dusting flour. If grease alone is used for preparing the surface of the oven sole, the amount necessary to prevent sticking of the batter is such that a definitely objectionable amount soaks into the surface of the cake. When flour is used by itself, an objectionable amount of flour unites with and adheres to the bottom of the cake, resulting in a tough, floury surface layer. The combination of a thin, even film of grease and a light even dusting of flour prevents either of these objectionable effects. The grease and flour together prevent any sticking of the cake to the baking sole, and also seem to bind each other so that very little adheres to the cake.

A further feature of the invention consists in an improved means for applying and spreading an even thin film of grease or oil to the baking surface, comprising a grease-applying brush or brushes vertically reciprocated so as to intermittently contact with the traveling surface to stipple the oil thereon, and a subsequent oscillatory brush or set of rotary brushes continually in contact with the surface to spread the stippled oil evenly thereon.

Still another feature of the invention is the improved flour duster, comprising a feed roller rotatably mounted in the outlet of a flour hopper and having a surface to which a quantity of flour can adhere, together with a high speed rotary brush mounted to engage the surface of the feed roller and flick the flour therefrom in a finely divided cloud of constantly uniform density onto the greased baking surface.

Both the greasing and dusting devices described in the two foregoing paragraphs are applicable not only to prepare the surface of a continuous baking sole, but they can also be used for the greasing and dusting of individual baking pans, which will be carried past them by a suitable conveyor.

In the accompanying drawings:

Figure 1 is a diagrammatic side elevation of a complete plant incorporating the invention.

Figure 2 is a part-sectional side elevation of the sole cleaning device.

Figure 3 is an elevation showing the greasing, flour dusting and batter-depositing devices.

Figure 4 is an end elevation of the grease spreading device, while

Figure 5 is an end elevation of the flour duster.

In carrying the invention into effect according to one convenient mode, an elongated baking chamber 10 is provided through which passes a traveling sole which may comprise an endless metal or steel band 11 supported upon driving and guiding rollers 12, 13. Instead of a steel band, the sole may be of the plate type, the fit of the plates being such that a continuous surface is provided for the upper run. The traveling sole 11 extends beyond the baking chamber at the feed-in end to accommodate the various devices for cleaning the band, applying grease and flour thereto and depositing the batter, which are supported upon the tables 14, 15. At the other end the band may extend a sufficient distance to provide a cooling effect and for delivery purposes.

Referring to Figure 2, the surface of the band 11 is maintained in a clean condition by means of a high speed rotary brush 16 supported by the table 14 adjacent the feed-in end of the oven. Instead of, or in addition to the brush a scraper (not shown) may be provided. Associated with the brush 16 is a rotary cleaning roll 17, the surface of which is covered with felt or the like. The brush 16 and the felt roll 17 are driven by belts 18 and 19 from the motor 20.

After the band has been cleaned, grease is applied thereto. The greasing device (see Fig. 4) is supported upon the table 15 and may conveniently comprise brush elements 21 arranged at the base of a hopper 22. The brushes extend across the band or sole of the oven and are adapted to be reciprocated vertically at a suitable speed so that they are continually being intermittently contacted with the oven sole. The vertical reciprocations are imparted by an eccentric 23, the coupling rod 24 of which engages a projection 25 on the hopper, which latter is mounted in suitable guides in the support 26.

Feeding of the grease from the hopper to the brush elements 22 is effected through a controlled elongated opening at the base of the hopper. This opening has associated therewith a relatively fixed valve or plunger 27, the arrangement being such that the vertical reciprocations of the hopper relatively to the fixed plunger cause the delivery of grease through the aperture. The plunger is adjustable, as by screw means, for regulating the feed.

Instead of one opening or aperture, a series of holes or apertures each controlled by a plunger may be provided.

In order to obtain an even film of grease on the band, means is provided for spreading the grease supplied by the greasing means, as by brush 28 extending across the sole and in contact therewith. The brush is given a relatively slow rotary or orbital movement in the plane of the oven sole by the cranks 29 driven from a cross shaft 30, whereby the grease which may be more or less patchy, is evenly distributed over the oven sole.

The grease-applying and spreading means just described provide a thin coating of grease or oil, as is essential in the baking of goods of delicate texture, such as sponge cake, and spread it uniformly over the entire baking surface. Furthermore, they do this without the waste of grease and the dirtying of everything in the neighborhood of the greasing station attendant upon the use of the customary spraying apparatus. The usual grease spray also requires the application of a heavy coating of grease to the baking conveyor or pans to insure a thorough covering of the entire surface.

Mounted forwardly of the greasing means in the direction of movement of the traveling oven band and supported by the table 15 are means for flouring the band.

According to the preferred form the flouring device comprises a hopper 31 extending across the band and provided at the lower part with a rotary feeding roller 32 and a cooperating rotary brush 34. Roller 32 is provided with a suitable surface such as felt, adapted to collect and feed a certain amount of flour. Any other suitable material may be provided, or the surface of the roller may be suitably fashioned as by scoring or providing grooves. The amount of flour fed by the feed roller may be regulated by providing a sliding valve or gate 33 in one wall of the hopper, the lower edge of the gate being adjusted relatively to the surface of the roller.

The high speed rotary brush 34 is mounted adjacent the feed roller and is adapted to engage the surface of the roller 32 so as to brush or flick the flour from the surface of the roller, delivering it onto the greased band in the form of a cloud or mist continuously uniform in density and quantity. The rotary brush is partially surrounded with a shield 35, the ends of which terminate adjacent the feed roller and oven sole respectively. The axes of the feed roller 32 and rotary brush 34 are mounted to permit of relative adjustment.

A depositing device 36 is mounted to feed batter material to the treated band or sole. One suitable form of depositor is provided with feeding rollers between which a sheet of batter or sponge material is continuously fed as the traveling sole of the oven passes thereunder, the arrangement being such that a measured quantity of sponge material is continuously discharged upon the sole or band. Adjustment means are provided whereby the quantity or thickness of the layer deposited may be varied. According to one convenient mode of operation the depositor 36 is driven from a motor 37 through a variable speed gear 38 and a train of gears 39.

The feed roller 32 is driven by gear wheels 40 from the depositor drive, while the rotary brush 34 is independently driven by a chain gear 41 and spur gearing 43 from the driving shaft 42 of the variable speed gear 38.

The eccentrics 23 of the greaser are driven by a chain 44 from the brush 34, and a second chain 45 drives the cross shaft 30 of the grease spreader.

At the delivery end of the oven band the sponge passes in a curved path at the turning 13 of the band. At this point the baked sponge is separated from the band by a fixed knife or a horizontal stretched wire 13a which strips the sponge from the band and causes it to transfer itself to an inclined traveling band or chute 46 in a reversed position so that the side which was towards the steel band during baking is uppermost. The sponge cake is discharged down the chute 46 onto a conveyor band 47 supported by a table 48. While on this horizontal conveyor the sponge cake may be cut, or filling material, such as jam, cream or the like, may be applied, either automatically or manually. The cake is then cut into the required lengths by rotary knives or other suitable devices and the cut lengths coiled into roll form or superimposed one on another to produce sandwich cakes or similar articles.

Instead of leading the sponge downwardly at point 13 it may be carried upwardly and reversed, or it may pass forwardly in a straight line and cut to lengths and turned over by hand to receive the filling or otherwise treated as desired.

Having thus described our invention, what we claim and desire to secure by Letters Patent is:

1. Apparatus for treating a baking surface preparatory to the depositing of batter thereon, comprising in combination means for cleaning the baking surface, vertically reciprocating grease-applying means arranged to come in contact intermittently with said baking surface, a grease-spreading brush in contact with and extending across the surface and provided with means for imparting thereto an orbital movement in the plane of the surface, means for dusting the greased surface with flour, and means for continuously moving the baking surface consecutively past the cleaning, grease-applying, grease-spreading and flour-dusting means.

2. In combination with conveyor means for feeding a baking surface to be greased, a vertically movable brush located above said baking surface, means for vertically reciprocating said brush to bring it into contact intermittently with said moving baking surface, means for feeding grease to said brush, a grease-spreading brush in contact with and extending across the surface, and means for imparting thereto an orbital movement in the plane of said surface.

3. In combination with conveyor means for feeding a baking surface to be greased, grease-applying means extending transversely of the baking surface, means for imparting vertical reciprocation to said greasing means to bring it intermittently into contact with the baking surface, grease-spreading means in contact with the baking surface beyond said grease-applying means, and actuating means for oscillating said grease-spreading means transversely of the baking surface.

CHARLES EDWARD TARONI.
ERNEST GEORGE ELLIS.